(12) United States Patent
Novosad (10) Patent No.: US 7,873,210 B2
(45) Date of Patent: Jan. 18, 2011

(54) AUTOMATIC FILM GRAIN REPRODUCTION

(75) Inventor: Justin Peace Novosad, Verdun (CA)

(73) Assignee: Autodesk, Inc., San Rafael, CA (US)

( * ) Notice: Subject to any disclaimer, the term of this patent is extended or adjusted under 35 U.S.C. 154(b) by 979 days.

(21) Appl. No.: 11/685,948

(22) Filed: Mar. 14, 2007

(65) Prior Publication Data

US 2008/0226162 A1  Sep. 18, 2008

(51) Int. Cl.
*G06K 9/00* (2006.01)
*H04N 9/73* (2006.01)

(52) U.S. Cl. .................... 382/162; 382/173; 348/223.1; 348/97

(58) Field of Classification Search ............ 348/223.1, 348/97; 382/162, 173, 254
See application file for complete search history.

(56) References Cited

U.S. PATENT DOCUMENTS

| | | | |
|---|---|---|---|
| 5,335,013 A | | 8/1994 | Faber |
| 5,641,596 A | * | 6/1997 | Gray et al. .................... 430/21 |
| 6,864,915 B1 | * | 3/2005 | Guimaraes et al. ....... 348/222.1 |
| 7,092,016 B2 | * | 8/2006 | Morton et al. .............. 348/241 |
| 7,327,382 B2 | * | 2/2008 | Rodriguez et al. ............ 348/96 |
| 7,738,721 B2 | * | 6/2010 | Gomila et al. .............. 382/254 |
| 2006/0082649 A1 | * | 4/2006 | Gomila et al. .............. 348/104 |
| 2006/0083314 A1 | | 4/2006 | Cooper et al. |

OTHER PUBLICATIONS

International Search Report mailed Mar. 25, 2009, International application No. PCT/IB2008/002704, International filing date Mar. 14, 2008.

Tomasi, C. et al., "Bilateral Filtering for Gray and Color Images," Proc. of the 1998 IEEE International Conference on Computer Vision, Bombay, India, 8 pgs. (1998).

Collis, B. et al., "Synthesising Film Grain," 1st European Conference on Visual Media Production, pp. 231-234 (2004).

Itu-T, H.264, "Series H: Audiovisual and Multimedia Systems: Infrastructure of audiovisual services—Coding of moving video," International Telecommunication Union, Mar. 2005, pp. 309-314.

Furnace: User Guide for Furnace 3.0 Autodesk Media & Entertainment Systems, The Foundry, "Plug-In Visual Effects," Dec. 22, 2006, pp. 88-98, 160-166.

Autodesk Flame 2007 User's Guide, pp. 749-772, Dec. 20, 2006.

SpeedSix, "SpeedSix Monsters V5.0 for Autodesk/Discreet Advanced Products on Linux RedHat EL WS3," Jun. 2, 2005, pp. 18, 132-137, 360-362.

Sapphire Plug-ins Version 3, GenArts, Inc. 2005, 10 pgs.

Autodesk Lustre 2007 User's Guide, pp. 347-355, Aug. 22, 2006.

\* cited by examiner

*Primary Examiner*—Bhavesh M Mehta
*Assistant Examiner*—Patrick L Edwards
(74) *Attorney, Agent, or Firm*—Gates & Cooper LLP (57) ABSTRACT

A method, apparatus, and article of manufacture provide the ability to automatically reproduce film grain into a new image. A reference image and new image are obtained. An image of the reference image is subdivided into two or more tiles. A grain simulation tool is then used to automatically determine if an object feature exists in each of the two or more tiles. Response curves are constructed for each of the tiles that does not contain an object feature. Frames of grain are produced/generated based on the response curves and added to the new image.

18 Claims, 7 Drawing Sheets

AUTOMATIC FILM GRAIN REPRODUCTION

BACKGROUND OF THE INVENTION

1. Field of the Invention

The present invention relates generally to image/video display and processing systems, and in particular, to a method, apparatus, and article of manufacture for simulating/reproducing film grain from a background image/clip in a new image/clip.

2. Description of the Related Art

Movies of still pictures shot using convention film often look grainy due to various physical and chemical aspects of the image formation and development processes. In film and photo compositing, it is sometimes desirable to simulate film grain. For example, when inserting computer animated content to a "real" image, grain can be artificially added to the computer generated image to create a more realistic effect. To create a seamless composition, the simulated film grain must match the grain present in the background "real"/reference image. Prior art methods require significant user input with respect to identifying the grain in the reference image. In addition, significant user interaction is required to reproduce/match/simulate the identified grain in the reference image. What is needed is the ability to easily and automatically (e.g., without significant user input) identify the grain in a reference image and to reproduce/match/simulate such an identified grain in a different image. These problems may be better understood with an explanation of prior art film grain simulation.

Different techniques may be utilized for adding grain to a background image. The H.264/MPEG-4 AVC describes an international video coding standard for use in a variety of applications (e.g., video telephony, television, storage, streaming video, etc.) that has been published by the International Telecommunication Union, Telecommunication Standardization Sector (a.k.a. ITU-T). Extensions to the H.264 standard provide various enhancements. A grain simulation mechanism is one such enhancement that was provided in the Fidelity Range Extensions (FRExt) Amendment 1. The grain simulation mechanism describes a film grain supplemental enhancement information (SEI) message that defines film grain characteristics such as size and intensity. The SEI allows a model of film grain statistics to be sent along with video data, that enables an analysis-synthesis style of video enhancement wherein a synthesized film grain is generated as a post-process when decoding, rather than requiring the encoder to determine and represent the exact film grain during the encoding process.

Thus, the SEI allows one to merely use a grain having the attributes specified in an SEI. While such a capability may be useful, it lacks the flexibility and ability to determine the grain (and the attributes/properties of such a grain) in a reference image where such an SEI does not exist for the reference image (e.g., the clip/film is scanned in or provided without the SEI or not in compliance with the H.264 specification). Further, the H.264 specification provides parameters and options that are not necessary to render realistic film grain effects. For example, photographic film grain aspects are dependent on exposure. Accordingly, it is important that grain parameters vary according to pixel color. The H.264 specification provides such a capability with the possibility to define up to five intensity intervals, each having a distinct set of parameters. The bounds of the intervals are user-defined, and each color channel has its own interval definitions. The use of intervals may be used to simplify the computational requirements and memory consumption of the grain generation algorithm. However, such a data representation is not user friendly.

In addition to the above problems, to identify a grainy area of a reference image, the prior art requires manual intervention. In this regard, the user is required to identify a series of regions in the reference image that correspond to smooth featureless areas. For example, the user must manually specify or identify a rectangular region of the reference image that contains the desired grain to be simulated. Such manual intervention is time consuming and requires the user to learn how to manipulate and identify the grain depending on the program being utilized.

SUMMARY OF THE INVENTION

One or more embodiments of the invention provide a fully automatic computer method that analyzes a reference image and estimates numerical parameters that describe the reference image's grain. The parameters include grain size and gain response curves for each color channel, and coefficients that describe the grain correlations between color channels. The grain may then be simulated/reproduced onto a new image.

Accordingly, embodiments of the invention automatically finds grain regions without any user input. In one or more embodiments, the user merely clicks an "Analyze" button that performs the analysis thereby providing "one click grain reproduction."

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
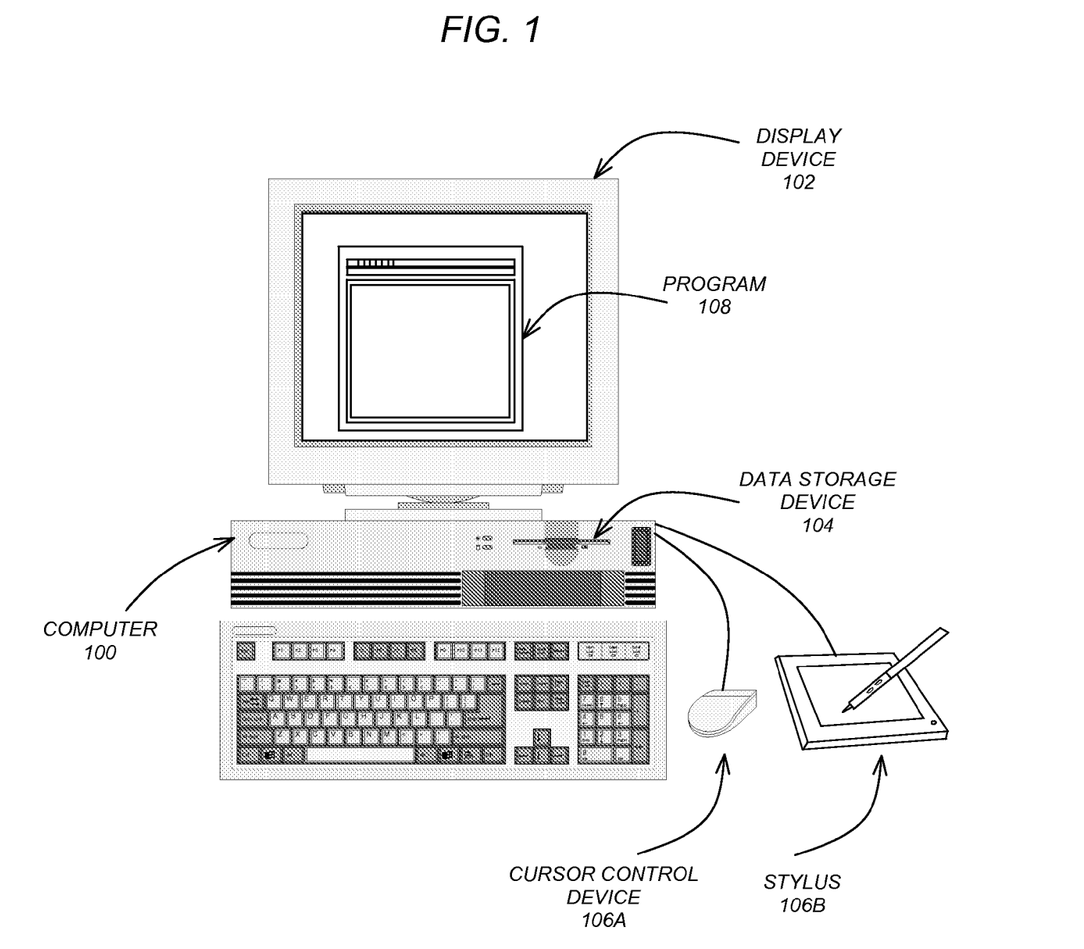
FIG. 1 is an exemplary hardware and software environment used to implement one or more embodiments of the invention.

FIG. 1 is an exemplary hardware and software environment used to implement one or more embodiments of the invention. Embodiments of the invention are typically implemented using a computer 100, which generally includes, inter alia, a display device 102, data storage device(s) 104, cursor control devices 106A, stylus 106B, and other devices. Those skilled in the art will recognize that any combination of the above components, or any number of different components, peripherals, and other devices, may be used with the computer 100.

One or more embodiments of the invention are implemented by a computer-implemented program 108 (or multiple programs 108). Such a program may be a 3D modeling application, animation application, effects application, rendering application, compiler, a parser, a shader, a shader manager library, a GPU program, or any type of program that executes on a computer 100. The program 108 may be represented by one or more windows displayed on the display device 102. Generally, the program 108 comprises logic and/or data embodied in/or readable from a device, media, carrier, signal, or computer-readable medium, e.g., data storage device 104, which could include one or more fixed and/or removable data storage devices 104, such as a zip drive, floppy disc drive, hard drive, CD-ROM drive, tape drive, etc. connected directly or indirectly to the computer 100, one or more remote devices coupled to the computer 100 via a data communications device, etc.

Further, the graphics program 108 is comprised of instructions which, when read and executed by the computer 100, causes the computer 100 to perform the steps necessary to implement and/or use the present invention. In addition, program 108 (or other programs described herein) may be an object-oriented program having objects and methods as understood in the art. Further, the program 108 may be written in any programming language including C, C++, Pascal, Fortran, Java™, etc. Further, as used herein, multiple different programs may be used and communicate with each other.

Figure 2:
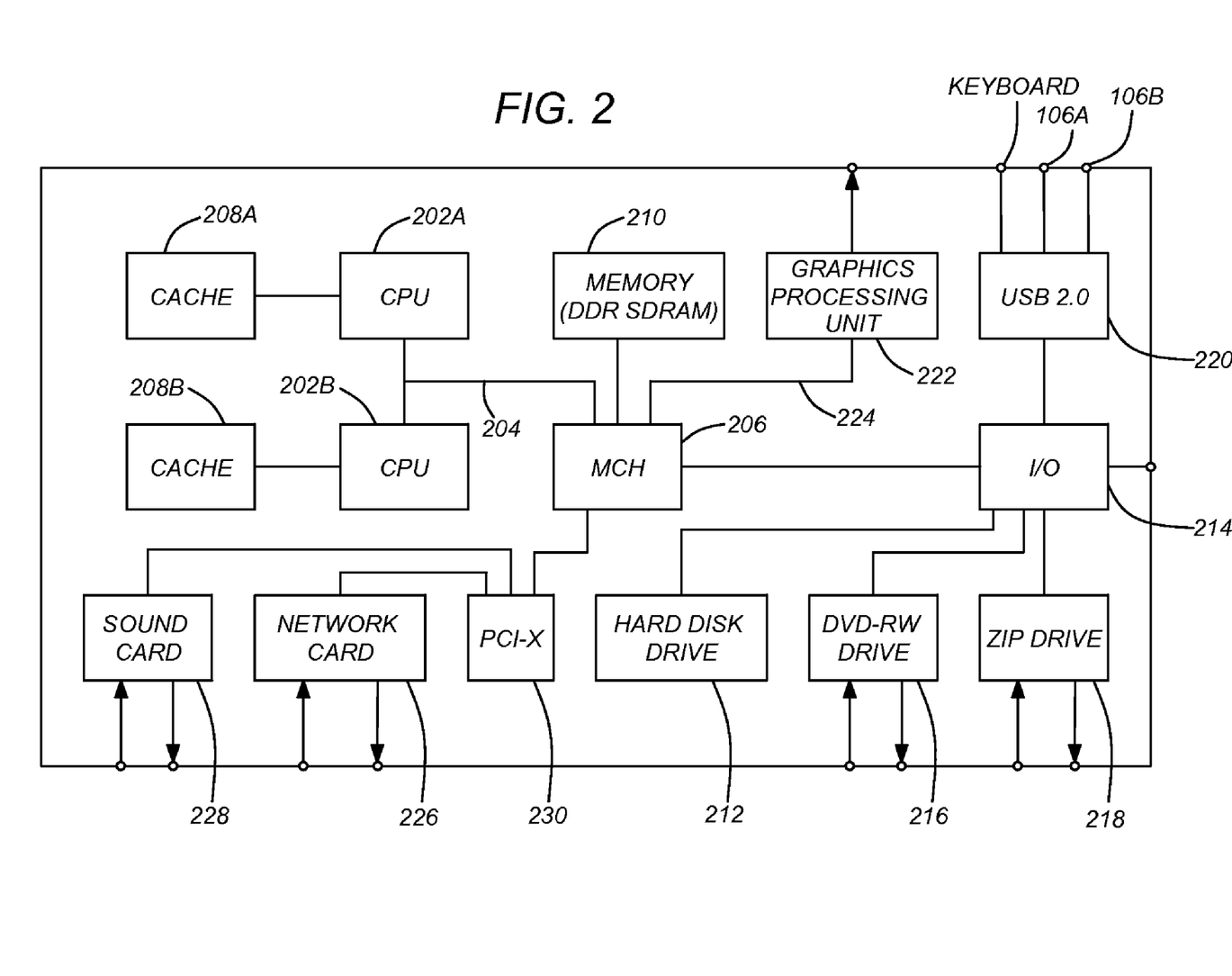
FIG. 2 illustrates details of the computer system of FIG. 1 in accordance with one or more embodiments of the invention.

The components of computer system 100 are further detailed in FIG. 2 and, in one or more embodiments of the present invention, said components may be based upon the Intel® E7505 hub-based chipset.

The system 100 includes two central processing units (CPUs) 202A, 202B (e.g., Intel® Pentium™ Xeon™ 4 DP CPUs running at three Gigahertz, or AMD™ CPUs such as the Opteron™/Athlon X2™/Athlon™ 64), that fetch and execute instructions and manipulate data via a system bus 204 providing connectivity with a Memory Controller Hub (MCH) 206. CPUs 202A, 202B are configured with respective high-speed caches 208A, 208B (e.g., that may comprise at least five hundred and twelve kilobytes), which store frequently accessed instructions and data to reduce fetching operations from a larger memory 210 via MCH 206. The MCH 206 thus co-ordinates data flow with a larger, dual-channel, double-data rate main memory 210 (e.g., that is between two and four gigabytes in data storage capacity) and stores executable programs which, along with data, are received via said bus 204 from a hard disk drive 212 providing non-volatile bulk storage of instructions and data via an Input/Output Controller Hub (ICH) 214. The I/O hub 214 similarly provides connectivity to DVD-ROM read-writer 216 and ZIP™ drive 218, both of which read and write data and instructions from and to removable data storage media. Finally, I/O hub 214 provides connectivity to USB 2.0 input/output sockets 220, to which the stylus and tablet 106B combination, keyboard, and mouse 106A are connected, all of which send user input data to system 100.

A graphics card (also referred to as a graphics processing unit [GPU]) 222 receives graphics data from CPUs 202A, 202B along with graphics instructions via MCH 206. The GPU 222 may be coupled to the MCH 206 through a direct port 224, such as the direct-attached advanced graphics port 8X (AGP™ 8X) promulgated by the Intel® Corporation, or the PCI-Express™ (PCIe) x16, the bandwidth of which may exceed the bandwidth of bus 204. The GPU 222 may also include substantial dedicated graphical processing capabilities, so that the CPUs 202A, 202B are not burdened with computationally intensive tasks for which they are not optimized.

Network card 226 provides connectivity to a framestore by processing a plurality of communication protocols, for instance a communication protocol suitable to encode, send and/or receive and decode packets of data over a Gigabit-Ethernet local area network. A sound card 228 is provided which receives sound data from the CPUs 202A, 202B along with sound processing instructions, in a manner similar to GPU 222. The sound card 228 may also include substantial dedicated digital sound processing capabilities, so that the CPUs 202A, 202B are not burdened with computationally intensive tasks for which they are not optimized. Network card 226 and sound card 228 may exchange data with CPUs 202A, 202B over system bus 204 by means of a controller hub 230 (e.g., Intel®'s PCI-X controller hub) administered by MCH 206.

Those skilled in the art will recognize that the exemplary environment illustrated in FIGS. 1 and 2 are not intended to limit the present invention. Indeed, those skilled in the art will recognize that other alternative environments may be used without departing from the scope of the present invention.

Software Embodiments

Film grain can be characterized using various parameters/characteristics. Two primary parameters of film grain are gain and grain size. The gain is the magnitude of the grain. The grain size is the spatial distribution of the grain and may range from coarse to fine. Both the gain and grain size may vary depending on the color. For example, the gain and grain size may vary from a light blue area to a dark area of a celluloid/image. In this regard, characteristic curves (that may be viewed as Bezier functions) can be used to describe the correspondence between the light intensity and grain size and grain gain.

Since the grain is normally blended into an image, to properly analyze the grain, one must analyze a smooth image patch (i.e., an image patch without any features) that has a uniform color. Once a smooth image patch has been located/determined, the background (i.e., uniform) color is extracted/subtracted from the smooth patch. By subtracting the background color, the grain can be isolated and the characteristics for the grain that correspond to the subtracted color can be obtained. As described above, the prior art requires the user to manually identify a smooth patch of the image. In this regard, a prior art user may identify the smooth patch using a tool to identify a rectangular (or other shape) area.

Figure 3:
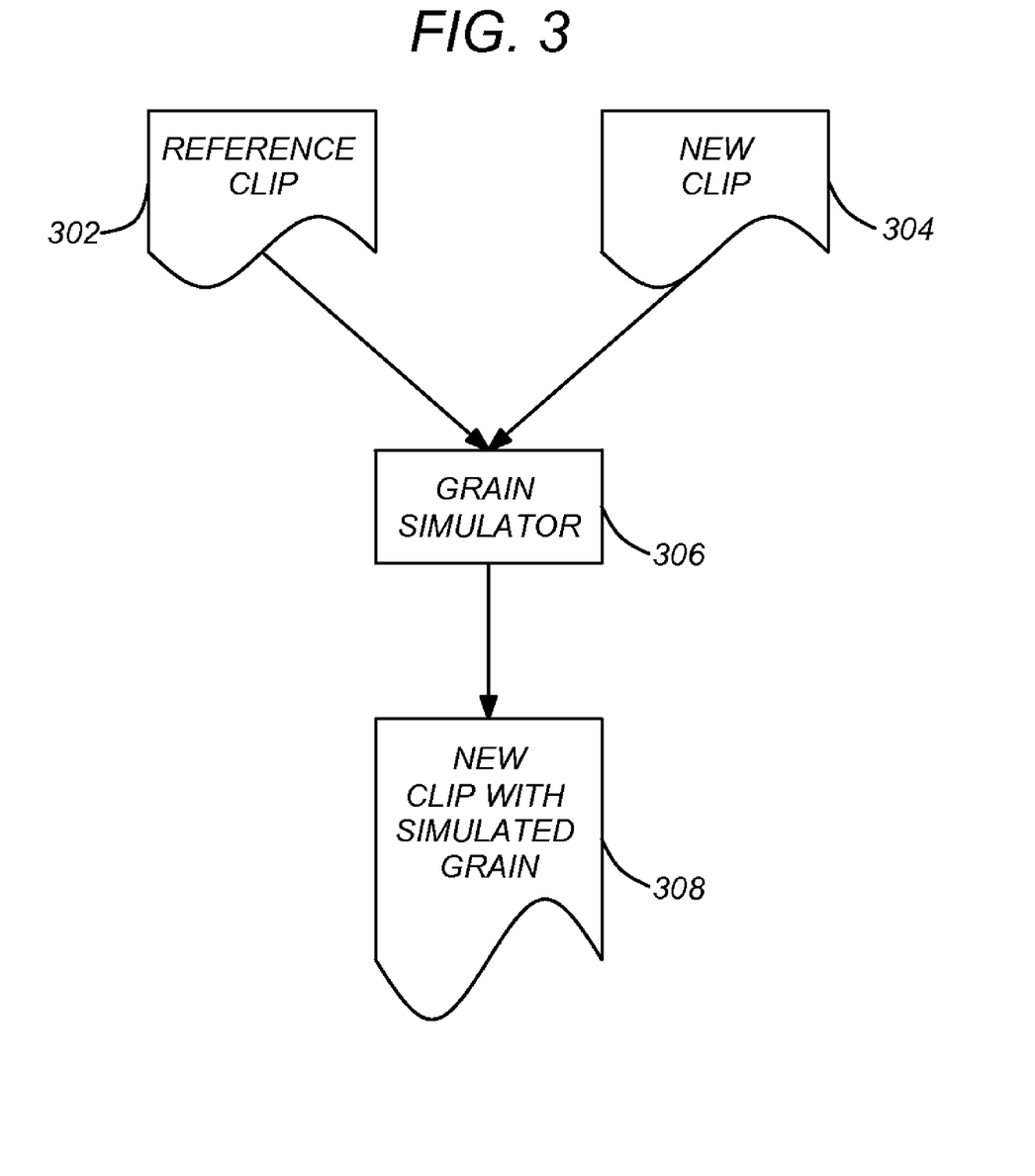
FIG. 3 illustrates the flow for simulating film grain in accordance with one or more embodiments of the invention.

FIG. 3 illustrates the flow for simulating film grain in accordance with one or more embodiments of the invention. As illustrated, a grain simulator tool 306 receives two inputs—the reference clip 302 and the new clip 304. The reference clip 302 comprises the filmed image that contains the grain desired to be reproduced/simulated. The new clip 304 is the clip that the user desires to add the grain from the reference clip 302 to. The grain simulator tool 306 is used by the user to identify the reference clip 302 and the new clip 304. Once the two inputs 302 and 304 have been identified, the grain simulator tool 306 produces the new clip with the simulated grain 308. The activation of the simulation to produce clip 308 may merely consist of the user selecting a button (e.g., an "analyze" button) that causes the computer to automatically (and without further/additional user input) identify the smooth patches of the image and retrieve/obtain the grain characteristics.

While the grain simulator tool 306 may automatically identify and retrieve the grain characteristics, the user may be presented with the option to modify or view the characteristics. Such modification or viewing capabilities may be presented in the form of the characteristic curves described above. Such characteristic curves may also be viewed as response curves that describe grain gain and size with respect to exposure.

Figure 4:
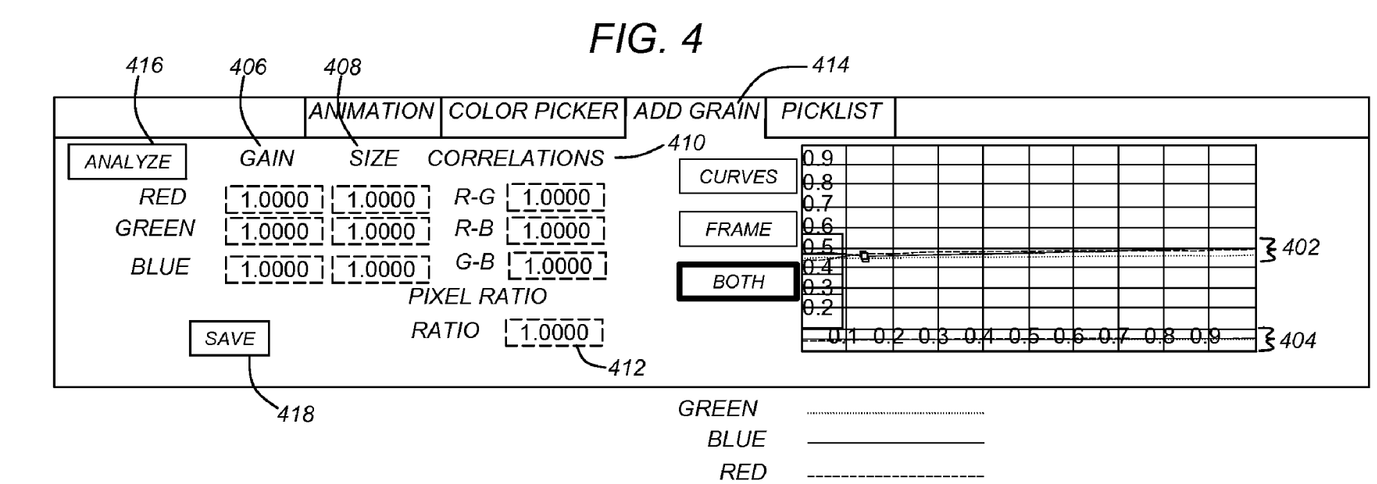
FIG. 4 illustrates an example of a response curve in accordance with one or more embodiments of the invention.

FIG. 4 illustrates an example of a response curve in accordance with one or more embodiments of the invention. The lines 402 in the upper portion of the graph are the grain size response curves. The lines 404 in the lower portion of the graph are the gain curves. Curve selection buttons may allow the user to select whether to display "gain", "size", or "both" types of curves. In FIG. 4, both "gain" 406 and "size" 408 options are selected. Accordingly, both curves in the form of lines 402 and 404 are illustrated in graph. Thus, the curves 402 describe the grain size in the red/green/blue color channels versus the red/green/blue intensity levels and the curves 404 describe the grain gain in the red/green/blue color channels versus the red/green/blue intensity levels.

A curve editor may further provide the ability to zoom and pan along the ordinate axis. Although it may be possible to force the curves 402 and 404 to negative values, embodiments may clamp the curves 402 and 404 to zero at processing time because negative gain and size values have no useful meaning. A home button (not illustrated) may also be used to reset the ordinate zoom and pan to show the range [0,1]. A frame button may also be used to adjust the ordinate zoom and pan to show the full range of the currently visible curves. A reset button may also provide the ability to set the currently selected curve to zero (0).

The numeric fields under the "gain" 406 and "size" 408 labels allow the user to adjust the grain gain specifying a multiplicative scale factor that is applied to the corresponding response curve. Such a capability provides a quick and efficient mechanism to modulate grain properties without having to manually edit each control point of the response curves. A "link" button may also be used to enable a proportional edit mode for gain and size values.

Depending on film properties and development process there may be significant statistical correlations between the grain present in different color channels. The color correlation fields 410 allow the user to specify these correlation coefficients. Such correlations 410 present the correlation between the color channels with respect to grain. For example, a grain spike in the red may be shown to accompany a spike in the green. Such a correlation is used to reproduce the grain.

Thus, as illustrated in FIG. 4, the user may be provided with the option to specify values for the gain 406, size 408, an/or correlations 410 that modify the curves 402-404 accordingly. Alternatively, the user may also have the option of selecting a particular curve 402-404 and modifying the curve as desired (e.g., by moving a point on one of the curves 402-404 in a desired direction). Thus, the user can manipulate the response curves.

The grain aspect ratio 412 is a factor used to account for discrepancies between pixel aspect ratio and grain aspect ratio. It should be noted that setting grain aspect ratio to a value other than one (which may be the default) is rarely necessary, even with anamorphic shots because the sampling aspect ratio of film scanners is usually near one. An example of a case where it may be necessary/useful to specify grain aspect ratio is when frames are resampled to an incongruous frame format, which may occur when compositing multiresolution material, or when explicit resolution conversions are applied.

The grain reproduction/simulation is performed by the grain simulator tool 306 which may also be referred to as an "Add Grain" tool. The Add Grain node 414 may further include a reference tab allowing the user to link a clip to analyze (the reference clip 302). When the user presses the "Analyze Grain" button 416, the software will automatically determine the shape of the response curves 402-404, the color correlation coefficients 410, and the ratio value 412. The scale factors 406-408 may also be reset to 1.0.

A grain profile may also be utilized and comprises the set of numerical parameters that describe grain appearance. Clicking the "Save" button 418 in the tool user interface allows the user save the current parameters into a profile located in a known location. If one or more grain parameter is animated, only the values at the current time (values displayed in the user interface) may be saved in a grain profile. To load a previously saved profile, the user may click on a "Load" menu button (not shown), which presents the user with the list of profiles available (i.e., saved in the past).

Once the grain simulator tool 306 produces the response curves representative of the grain, embodiments of the invention utilize such response curves to simulate the grain into the new clip 308.

As described above, one of the first steps the grain simulator tool 306 performs is that of automatically, and without user input, identifying the smooth image patches in the reference clip 302. To conduct such an analysis, embodiments of the invention look for areas of the reference clip where color variation appears to be random. Further, the tool 306 attempts to detect any type of structure (such as image edges or gradients) in the reference image 302. If a structure can be found, the area containing the structure can be from consideration as containing the desired grain (since the grain analysis must be conducted on smooth patches of the image).

Figure 5:
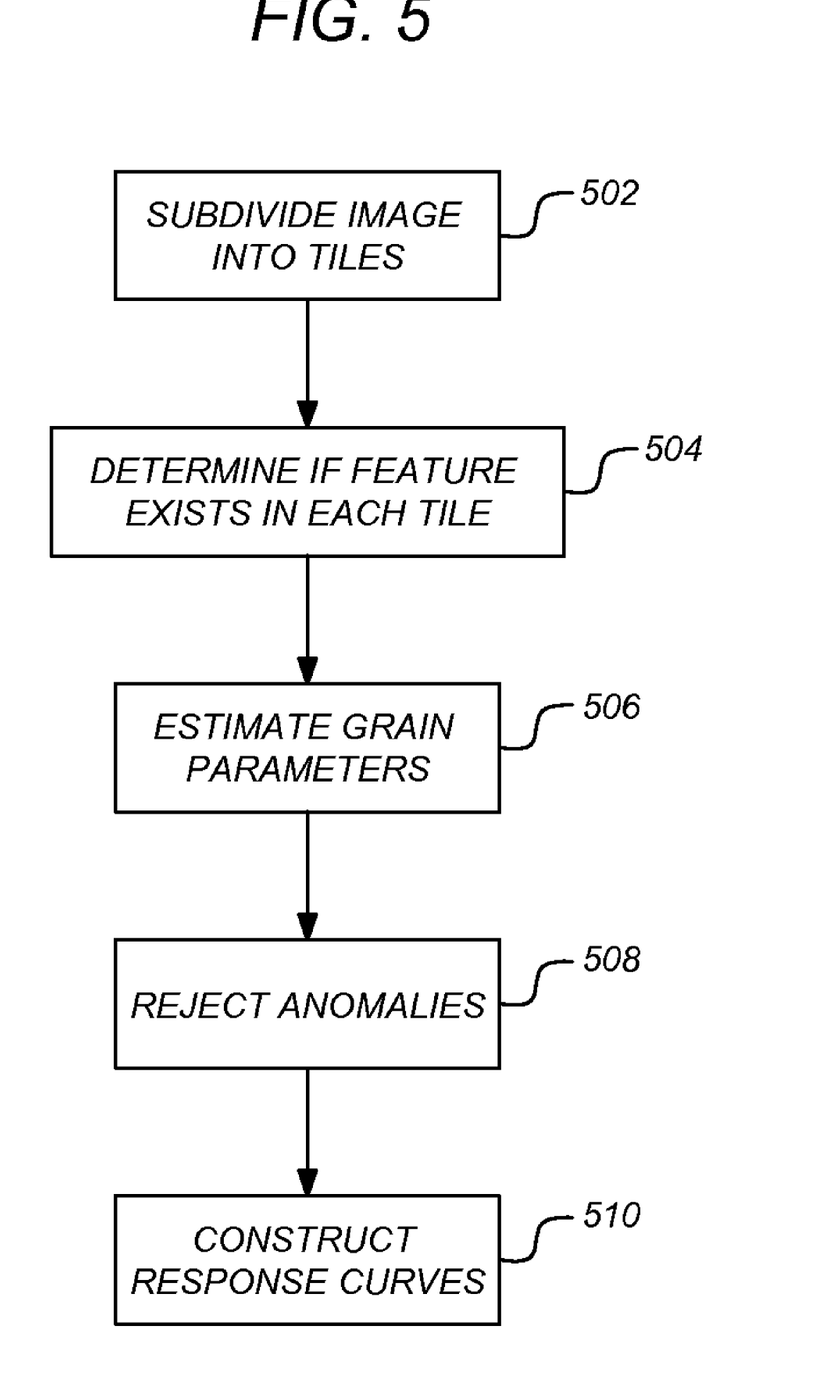
FIG. 5 illustrates the logical flow for automatically identifying the area of the reference clip that contains a desired grain and constructing grain parameters in accordance with one or more embodiments of the invention.

FIG. 5 illustrates the logical flow for automatically identifying the areas of the reference clip that contain a desired grain and constructing grain parameters in accordance with one or more embodiments of the invention. At step 502, an image of the clip 302 is subdivided into small tiles. For example, each tile may comprise 32×32 pixels. However, while the size of the tile may vary, the tile size should be large enough to compute accurate statistics but small enough such that at least one tile will not contain any features (and can therefore be used to determine grain parameters). The process continues by analyzing each tile of the image to determine if the tile contains a good candidate region or not.

At step 504, each tile is examined to determine if a feature exists in the tile. The objective is to ensure that any structure/object in a tile is random and to determine if any trend within a tile indicates that an image feature exists in the tile (e.g., the edge of an object). Many methods may be used to determine if a feature exists in a tile and such methods are intended to be within the scope of the invention. An example of one method is that of performing a spectral analysis on a Fourier transform.

In another example of the examination performed at step 504, one or more embodiments of the invention utilize a regression analysis (e.g., linear or quadratic regression analysis). A regression analysis is a statistical tool for the investigation of relationships between variables (i.e., the causal effect of one variable upon another). The goal of regression analysis is to determine the values of parameters for a function that cause the function to best fit a set of data observations. Different methods may be used to fit a function. One or more embodiments of the invention use quadratic regression analysis (i.e., to determine/estimate parameters for a quadratic equation). Thus, a quadratic expression of image color as a function of image location is of the form $I_c(x,y)=a_c x^2 + b_c y^2 + c_c xy + d_c x + e_c y + f_c$, where coefficients $a_c$ to $f_c$ are the function parameters for color component c; x and y express the spatial location of the image sample (i.e. pixel coordinates); $I_c(x,y)$ is the intensity of color component c at location (x,y); c is a component of the colorspace in which the image is encoded (e.g. red, green or blue for RGB images). The graph of such a function is a paraboloid.

Figure 6:
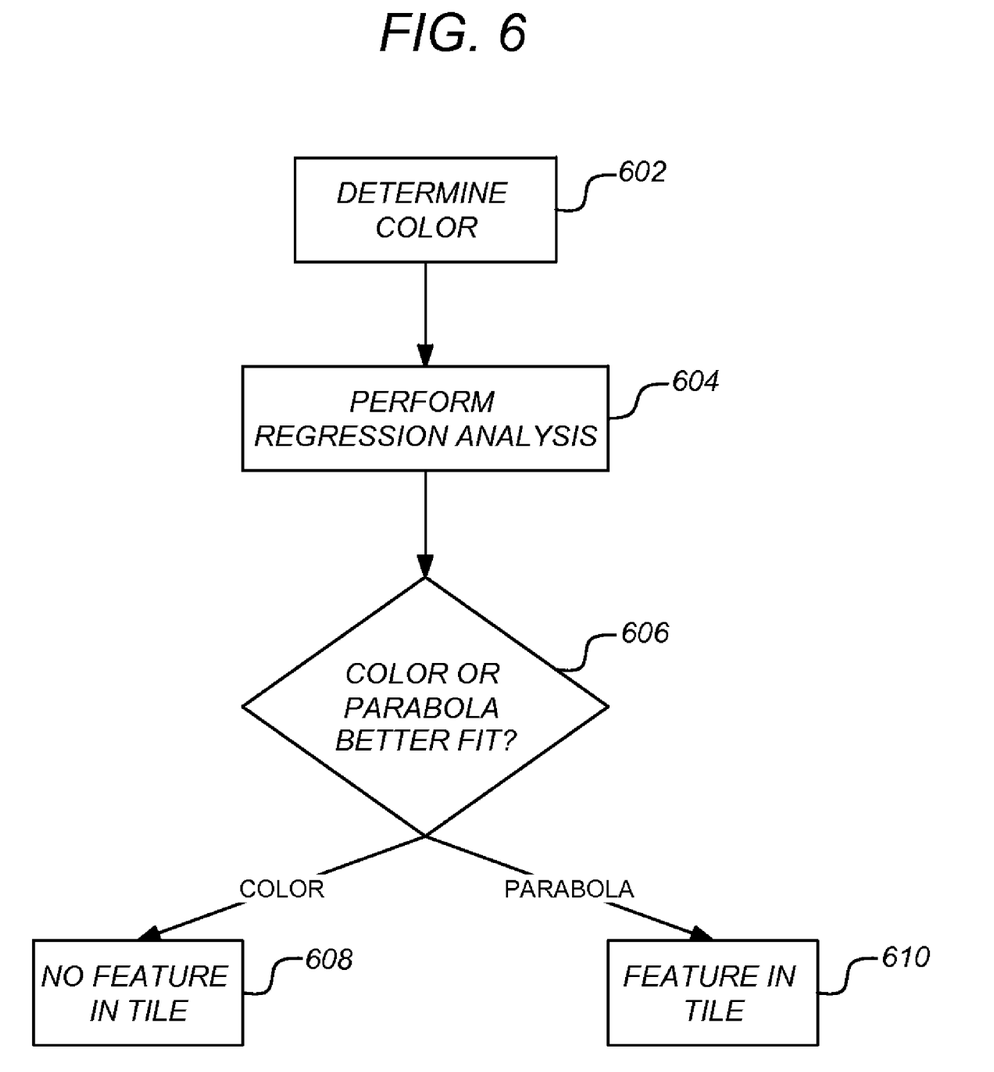
FIG. 6 illustrates the logical flow for conducting regression analysis to determine the presence of a feature in a tile in accordance with one or more embodiments of the invention.

FIG. 6 illustrates the logical flow for conducting regression analysis to determine the presence of a feature in a tile in accordance with one or more embodiments of the invention. At step 602, a constant average color for an area of the tile is determined. At step 604, regression analysis is used to fit a 2D parabola onto the color values of the image pixels in the tile.

At step 606, a determination is made regarding whether the color or the parabola is a better fit. However, it should be noted that the quadratic/parabola will always have a better fit (since the function contains more parameters). Accordingly, the determination at step 606 may utilize a threshold value or set of criteria to determine if the quadratic is a significantly better fit than the color. Such criteria may be determined by trial and error and can be subject to continuous improvement (which may be automatically [e.g., without user input] conducted). If the threshold or criteria is not met, the determination of step 606 concludes that the color provides a better fit, thereby resulting in a determination that a feature does no exist in the tile at step 608. However, if the quadratic provides a better fit than the color (i.e., the fit lies above the established threshold or complies with the criteria), the system determines that a feature exists in the tile at step 610.

Referring again to FIG. 5, step 504 is performing an analysis of the tiles in the image to determine if a feature exists in the tile. In accordance with FIG. 6, if the quadratic does not fit any better than the constant color, it indicates that there is random structuring in the tile (i.e., in the portion of the image represented by the tile) and thereby a lack of a feature.

At step 506, the parameters for the grain are estimated for each of the valid tiles (i.e., for each of the tiles that do not contain a feature). As described above, such estimated parameters may include grain size, grain gain, color correlation and aspect ratio. Once the parameters for each tile have been automatically calculated/computed, any tiles containing anomalies are discarded at step 508. Such anomalies may be examined independent of the remaining tiles or as a result of a comparison with the remaining tiles. For example, when film is scanned, the grain is expected to be relatively fine. As a result, if a grain size is detected above a certain bounds, it may be concluded that such a tile contains a texture and should not be used in the grain analysis. Similarly, if a tile produces results that are sufficiently different/distinguishable from the remaining tiles (i.e., based on a threshold value or set of properties), it may be assumed that such a tile is a statistical outlier or contains a feature and should therefore not be used in the grain simulation. For example, if a grain size in one tile is too large in comparison to the remaining tiles, the tile with the large grain size may be discarded.

At step 510, the response curves for the identified tiles (e.g., the tiles that do not contain a feature and that have not been discarded as anomalous) are constructed. As described above, such response curves describe the grain size in the RGB color channels versus the RGB intensity and versus the RGB gain. Further, the parameters may also include a correlation between the color channels, and grain aspect ratio.

Figure 7:
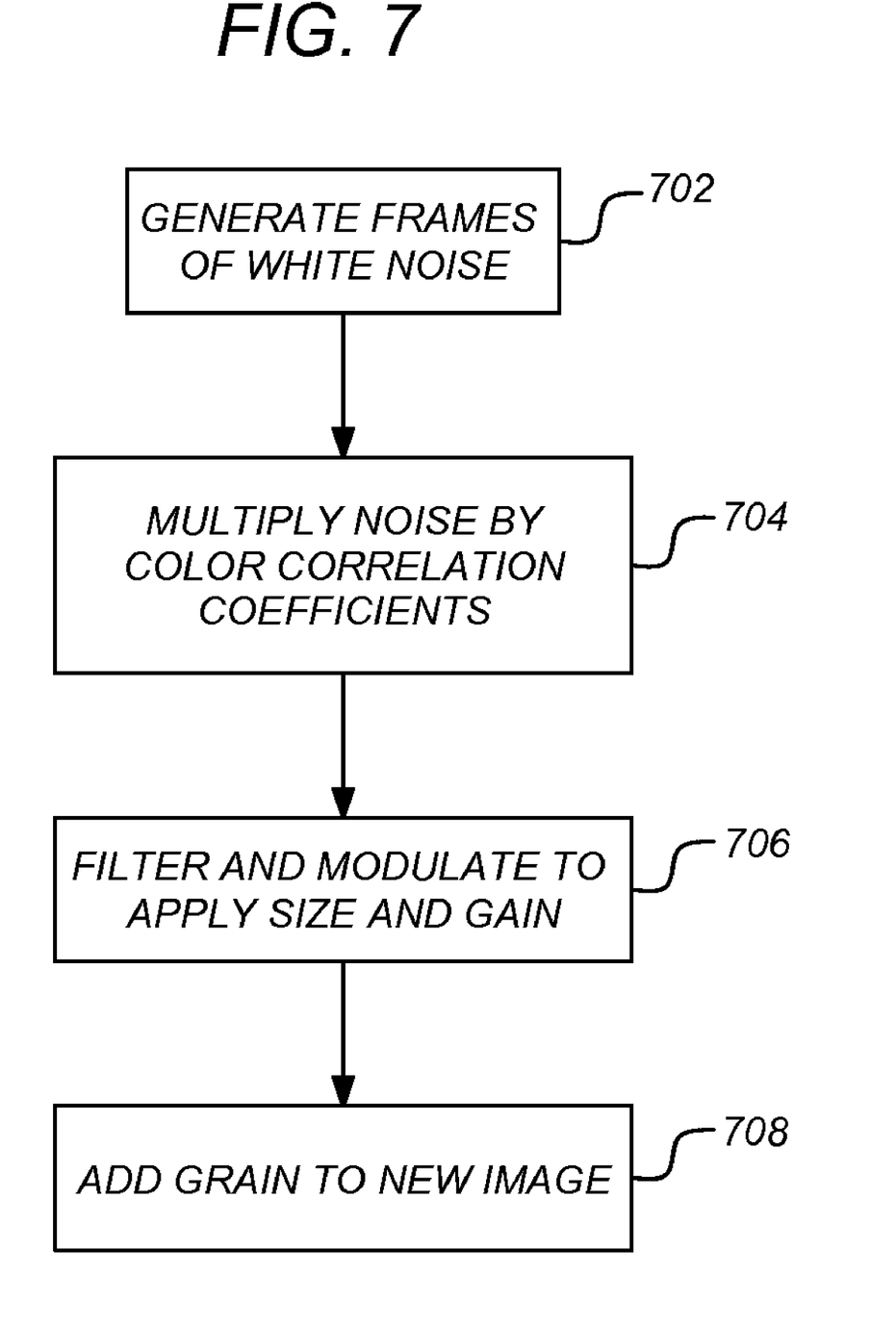
FIG. 7 illustrates the logical flow for simulating a grain in a new clip in accordance with one or more embodiments of the invention.

FIG. 7 illustrates the logical flow for simulating a grain in a new clip in accordance with one or more embodiments of the invention. At step 702, frames of white noise are generated. At step 704, the frames of white noise are then multiplied by a matrix to apply the color coefficients defined above. The color coefficients may be applied to the white noise by multiplying by a matrix comprised of a factorization of a covariance matrix. Such a technique is a standard multivariate normal random distribution operation.

The result of step 704 is correlated noise that must be filtered and modulated at step 706 to apply the size and gain. Thus, at step 706, the correlated noise is essentially smoothened to apply the grain size and then modulated or multiplied by a factor to apply the gain.

The result of step 706 is pure grain which can simply be arithmetically added to the new clip 304 to produce the new clip with the simulated grain 308. Such an addition may be performed with a simple add or compositing operation.

Grain Removal

In addition to the above discovery and simulation of a grain, the new clip or the clip that the user desires to contain the simulated grain may already have a grain within the clip. In such an instance, embodiments of the invention may first filter out/remove the grain in the clip followed by the combination or addition of the simulated grain (i.e., from the reference clip) as described above.

One or more embodiments of the invention provide the ability to remove the grain using a self-adjusting grain removal tool. To remove the grain, the grain analysis of FIG. 5 (and optionally FIG. 6 for step 504) is conducted. A filter is then used to subtract or remove the grain from the clip. Such a filter may comprise a bilateral filter that comprises a simple, non-iterative scheme for edge-preserving smoothing. In this regard, a bilateral filter smoothes the image while preserving the edges and high contrast detail of the image. Such a filter performs such an operation using a nonlinear combination of nearby image values. A bilateral filter combines colors based on both their geometric closeness and their photometric similarity. Bilateral filters are further defined in the following article which is in fully incorporated by reference herein: C. Tomasi and R. Manduchi, *Bilateral Filtering for Gray and Color Images*, Proceedings of the Sixth International Conference on Computer Vision, Bombay, India, at 839-846 (Jan. 4-7, 1998).

While a filter (e.g., a bilateral filter) can be used to remove the grain, the more aggressive the filter, the more the quality of the image may deteriorate. Accordingly, based on the characteristics and parameters of the grain (and/or potentially the response curves) that are automatically determined (i.e., without user input), embodiments of the invention can adjust the aggressiveness of the filter. In this regard, embodiments automatically and without user input adjust the filter based on the grain parameters. Such adjusting attempts to completely filter out the grain while maintaining the remainder of the image features as intact as possible. Thus, the add grain step 708 of FIG. 7 may also include the automatic grain analysis to remove the grain.

Logical Flow

FIGS. 3, 5, 6, and 7 illustrate the logical flow for reproducing film grain from a reference image/clip into a new image/clip in accordance with one or more embodiments of the invention. As set forth herein, embodiments of the invention are intended to be used in connection with both still pictures (e.g., single frames) and clips (i.e., temporally sequenced frames) alike. Accordingly, as used herein, the term image is intended to include both pictures and clips.

In FIG. 3, a reference image 302 and new image 304 are obtained and processed by a grain simulator tool 306.

Referring to FIG. 5, the tool 306 subdivides an image of the reference clip/image 302 into two or more tiles at step 502. The tool 306 then automatically determines if an object feature exists in each of the two or more tiles. Such a determination may include the steps set forth in FIG. 6 (performed for each of the tiles). Namely, a constant average color is determined for the tile (at step 602) followed by performing/conducting a quadratic regression analysis to obtain a parabola for the tile (at step 604). The fits of the constant average color to the tile and the parabola to the tile are compared (at step 606) and if the parabola fit is beyond a threshold level of the color fit, the tool 306 determines that the tile contains an object feature (at step 610).

Referring again to FIG. 5, the tool 506 may optionally (and/or automatically without user input) estimate grain parameters for each of the two or more tiles and reject a tile from consideration in the grain simulation process if the tile contains an anomaly based on the grain parameters.

Response curves are constructed for each of the two or more tiles that do not contain an object feature at step 510. Such response curves may comprise: grain size in red/green/blue color channels versus red/green/blue intensity; grain gain in the red/green/blue color channels versus red/green/blue intensity; and a correlation between the red/green/blue color channels. When used in other color-spaces, different response curves may be utilized.

If the new image already contains a grain, the tool 306 may remove the grain from the new image. Such grain removal performs steps similar to that described above with respect to creating the response curves. An image of the new clip/image is subdivided into two or more tiles and the tool 306 automatically determines if an object feature exists in each of the tiles. Response curves are then constructed for each of the tiles that do not contain an object feature. Once the characterization and parameters for the grain has been obtained (i.e., in the form of the response curves), the tool 306 removes the grain by bilaterally filtering the new clip/image based on the response curves (i.e., the parameters of the bilateral filter are adjusted based on the response curves).

To create a grain to be added to the new clip/image 304, frames of grain are produced that are based on the response curves (i.e., from the reference image 302) and added to the new clip/image 304 at step 708. The production of the frames of grain is set forth in FIG. 7. Namely, frames of white noise are generated (at step 702), and each noise sample is multiplied by a correlation-inducing color transformation matrix derived from the color correlation coefficients to obtain correlated noise (at step 704). The correlated noise is then filtered to apply the grain size (at step 706) and then modulated to apply the grain gain (at step 706). The pure grain frames resulting from steps 702-706 are then added to the new clip/image 306.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. Further, any type of programming language or programming language components could be used with the present invention. In addition, any combination either alone or together of the above-described components could be used within the present invention.

In addition, as described herein, embodiments of the invention may include color representations other than RGB (e.g., YCrCb, HSL, YUV, etc.). In this regard, a YCrCb color space based embodiment may be widely used in video transmission and storage. Further, H.264 allows for grain to be directly parameterized and generated in the YCrCb color space.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for reproducing film grain in computer software comprising:
    obtaining a reference image;
    obtaining a new image;
    subdividing an image of the reference image into two or more tiles;
    automatically determining if an object feature exists in each of the two or more tiles, wherein the automatically determining comprises performing the following steps for each tile:
    determing a constant average color for the tile;
    performing a quadratic regression analysis to obtain a parabola for the tile;
    determining a first fit value corresponding to the fit between the constant average color to the tile;
    determining a second fit value corresponding to the fit between the parabola to the tile;
    comparing the first and second fit values, and if the second fit value is beyond a threshold level above the first value, determining that the tile contains an object feature;
    constructing response curves for each of the two or more tiles that do not contain an object feature;
    producing frames of grain based on the response curves; and
    adding the frames of grain to the new image.

2. The method of claim 1 further comprising:
    estimating a grain parameter for each of the two or more tiles; and
    rejecting one or more of the two or more tiles if the one or more tiles contain an anomaly based on the grain parameter.

3. The method of claim 2 wherein the grain parameter comprises a grain aspect ratio that accounts for differences between a pixel aspect ratio and a grain aspect ratio.

4. The method of claim 1 wherein the response curves comprise:
    grain size in red/green/blue color channels versus red/green/blue intensity;
    grain gain in the red/green/blue color channels versus red/green/blue intensity; and
    a correlation between the red/green/blue color channels.

5. The method of claim 4 wherein the producing frames of grain comprises:
generating frames of white noise;
multiplying the white noise samples in the frames by a correlation-inducing color transformation matrix to obtain correlated noise;
filtering the correlated noise to apply the grain size; and
modulating the correlated noise to apply the grain gain.

6. The method of claim 1, wherein the new image contains a grain, the method further comprising removing the grain from the new image by:
subdividing an image of the new image into two or more tiles;
automatically determining if an object feature exists in each of the two or more tiles;
constructing response curves for each of the two or more tiles that do not contain an object feature; and
bilaterally filtering the new image to remove the grain based on the response curves.

7. A computer implemented system for reproducing film grain in computer software comprising:
(a) a computer;
(b) a grain simulation application tool executing on the computer, wherein the grain simulation application tool is configured to:
(i) obtain a reference image;
(ii) obtain a new image;
(iii) subdivide an image of the reference image into two or more tiles;
(iv) automatically determine if an object feature exists in each of the two or more tiles, wherein the automatically determining comprises performing the following steps for each tile:
determing a constant average color for the tile;
performing a quadratic regression analysis to obtain a parabola for the tile;
determining a first fit value corresponding to the fit between the constant average color to the tile;
determining a second fit value corresponding to the fit between the parabola to the tile;
comparing the first and second fit values, and if the second fit value is beyond a threshold level above the first value, determining that the tile contains an object feature;
(v) construct response curves for each of the two or more tiles that do not contain an object feature;
(vi) produce frames of grain based on the response curves; and
(vii) add the frames of grain to the new image.

8. The system of claim 7 wherein the tool is further configured to:
estimate a grain parameter for each of the two or more tiles; and
reject one or more of the two or more tiles if the one or more tiles contain an anomaly based on the grain parameter.

9. The system of claim 8 wherein the grain parameter comprises a grain aspect ratio that accounts for differences between a pixel aspect ratio and a grain aspect ratio.

10. The system of claim 7 wherein the response curves comprise:
grain size in red/green/blue color channels versus red/green/blue intensity;
grain gain in the red/green/blue color channels versus red/green/blue intensity; and
a correlation between the red/green/blue color channels.

11. The system of claim 10 wherein the tool is configured to produce frames of grain by:
generating frames of white noise;
multiplying the white noise in the frames by a correlation-inducing color transformation matrix to obtain correlated noise;
filtering the correlated noise to apply the grain size; and
modulating the correlated noise to apply the grain gain.

12. The system of claim 7, wherein the new image contains a grain, and wherein the tool is further configured to remove the grain from the new image by:
subdividing an image of the new image into two or more tiles;
automatically determining if an object feature exists in each of the two or more tiles;
constructing response curves for each of the two or more tiles that do not contain an object feature; and
bilaterally filtering the new image to remove the grain based on the response curves.

13. A program storage device, readable by a computer, tangibly embodying at least one program of instructions executable by the computer to perform method steps for reproducing film grain in computer software, the method steps comprising:
obtaining a reference image;
obtaining a new image;
subdividing an image of the reference image into two or more tiles;
automatically determining if an object feature exists in each of the two or more tiles, wherein the automatically determining comprises performing the following steps for each tile:
determing a constant average color for the tile;
performing a quadratic regression analysis to obtain a parabola for the tile;
determining a first fit value corresponding to the fit between the constant average color to the tile;
determining a second fit value corresponding to the fit between the parabola to the tile;
comparing the first and second fit values, and if the second fit value is beyond a threshold level above the first value, determining that the tile contains an object feature;
constructing response curves for each of the two or more tiles that do not contain an object feature;
producing frames of grain based on the response curves; and
adding the frames of grain to the new image.

14. The article of manufacture of claim 13, the method steps further comprising:
estimating a grain parameter for each of the two or more tiles; and
rejecting one or more of the two or more tiles if the one or more tiles contain an anomaly based on the grain parameter.

15. The article of manufacture of claim 14 wherein the grain parameter comprises a grain aspect ratio that accounts for differences between a pixel aspect ratio and a grain aspect ratio.

16. The article of manufacture of claim 13 wherein the response curves comprise:
grain size in red/green/blue color channels versus red/green/blue intensity;
grain gain in the red/green/blue color channels versus red/green/blue intensity; and
a correlation between the red/green/blue color channels.

17. The article of manufacture of claim 16 wherein the producing frames of grain comprises:
   generating frames of white noise;
   multiplying the white noise in the frames by a correlation-inducing color transformation matrix to obtain correlated noise;
   filtering the correlated noise to apply the grain size; and
   modulating the correlated noise to apply the grain gain.

18. The article of manufacture of claim 13, wherein the new image contains a grain, the method steps further comprising removing the grain from the new image by:
   subdividing an image of the new image into two or more tiles;
   automatically determining if an object feature exists in each of the two or more tiles;
   constructing response curves for each of the two or more tiles that do not contain an object feature; and
   bilaterally filtering the new image to remove the grain based on the response curves.

* * * * *